US010767790B2

(12) United States Patent
Roodenburg et al.

(10) Patent No.: US 10,767,790 B2
(45) Date of Patent: *Sep. 8, 2020

(54) OFFSHORE VESSEL, MARINE PIPELINE INSTALLATION SYSTEM AND METHOD

(71) Applicant: ITREC B.V., Schiedam (NL)

(72) Inventors: Joop Roodenburg, Schiedam (NL); Ronny Lambertus Waltherus Nouwens, Schiedam (NL); Wilco Stavenuiter, Schiedam (NL)

(73) Assignee: ITREC B. V., Schiedam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/702,070

(22) Filed: Dec. 3, 2019

(65) Prior Publication Data
US 2020/0103049 A1 Apr. 2, 2020

Related U.S. Application Data

(62) Division of application No. 15/570,002, filed as application No. PCT/NL2016/050223 on Mar. 31, 2016, now Pat. No. 10,527,195.

(30) Foreign Application Priority Data

Apr. 28, 2015 (WO) ................ PCT/NL2015/050285

(51) Int. Cl.
*F16L 1/235* (2006.01)
*F16L 1/16* (2006.01)
(Continued)

(52) U.S. Cl.
CPC ................ *F16L 1/16* (2013.01); *B63B 35/03* (2013.01); *E21B 19/006* (2013.01);
(Continued)

(58) Field of Classification Search
CPC ........................................................ F16L 1/235
(Continued)

(56) References Cited

U.S. PATENT DOCUMENTS

| 10,527,195 | B2 * | 1/2020 | Roodenburg | ........... E21B 19/22 |
| 2012/0195716 | A1 | 8/2012 | Nouwens et al. | |
| 2014/0010595 | A1 | 1/2014 | Maloberti et al. | |

FOREIGN PATENT DOCUMENTS

| CN | 102688925 A | 9/2012 |
| GB | 2 303 897 A | 3/1997 |

(Continued)

OTHER PUBLICATIONS

English translation of the Chinese Office Action, dated Jan. 22, 2019, for Chinese Application No. 201680031763.X.
(Continued)

*Primary Examiner* — Sunil Singh
(74) *Attorney, Agent, or Firm* — Birch, Stewart, Kolasch & Birch, LLP

(57) ABSTRACT

A marine reel lay method pipeline installation system for laying a flexible pipeline on the seabed a pipeline includes a pipeline launch tower adapted to launch the flexible pipeline in a firing line along said tower; a pipeline guide provided at an elevated position; one or more tensioners, wherein the tensioner frame includes two frame segments with track units, the two frame segments being adapted to be conjoined to each other and being pivotably mounted to said pipeline launch tower about a respective vertical tensioner pivot axis, allowing said two frame segments to be pivotable between a closed flexible pipeline laying configuration; and an open configuration; one or more vertical trolley rails supported by said pipeline launch tower and positioned between said vertical tensioner pivot axes of said two frame segments; a trolley movable along said one or more vertical trolley rails in a vertical trolley path which is unobstructed (Continued)

when said two frame segments are in the open configuration; and a hoisting device being adapted to lower and raise said trolley.

8 Claims, 8 Drawing Sheets

(51) Int. Cl.

| | | |
|---|---|---|
| *F16L 1/20* | (2006.01) |
| *F16L 1/12* | (2006.01) |
| *B63B 35/03* | (2006.01) |
| *E21B 19/22* | (2006.01) |
| *E21B 19/00* | (2006.01) |
| *E21B 19/06* | (2006.01) |
| *E21B 19/24* | (2006.01) |
| *E21B 15/02* | (2006.01) |

(52) U.S. Cl.
CPC ............ *E21B 19/008* (2013.01); *E21B 19/06* (2013.01); *E21B 19/22* (2013.01); *E21B 19/24* (2013.01); *F16L 1/123* (2013.01); *F16L 1/20* (2013.01); *F16L 1/203* (2013.01); *F16L 1/235* (2013.01); *E21B 15/02* (2013.01)

(58) Field of Classification Search
USPC .................................. 405/166, 168.3, 168.4
See application file for complete search history.

(56) References Cited

FOREIGN PATENT DOCUMENTS

| | | |
|---|---|---|
| WO | WO 2007/108673 A1 | 9/2007 |
| WO | WO 2009/134116 A1 | 11/2009 |
| WO | WO 2014/120004 A1 | 8/2014 |
| WO | WO 2015/167328 A1 | 11/2015 |

OTHER PUBLICATIONS

International Search Report, issued in PCT/NL2016/050223, dated Sep. 14, 2016.
Written Opinion of the International Searching Authority, issued in PCT/NL2016/050223, dated Sep. 14, 2016.

* cited by examiner

OFFSHORE VESSEL, MARINE PIPELINE INSTALLATION SYSTEM AND METHOD

CROSS-REFERENCE TO RELATED APPLICATIONS

This application is a Divisional of co-pending U.S. patent application Ser. No. 15/570,002 filed on Oct. 27, 2017, which is the National Phase of PCT International Application No. PCT/NL2016/050223, filed on Mar. 31, 2016, which claims the benefit under 35 U.S.C. § 119(a) to PCT Application No. PCT/NL2015/050285, filed in Netherlands on Apr. 28, 2015, all of which are hereby expressly incorporated by reference into the present application.

BACKGROUND OF THE INVENTION

A first aspect of the present invention relates to a vessel adapted to perform subsea wellbore related operations and a method for performing such subsea wellbore related operations, in particular including module handling and laying flexible pipeline, e.g. wellbore intervention.

Such "wellbore intervention vessels" are well known and commercially available for years, e.g. from the applicant. In general, these are light-weight vessels provided with a moonpool and having a stationary drilling mast having a closed contour adjacent said moonpool. Such a closed contour drilling mast is of a relatively light-weight construction.

In order to handle modules, one or more vertical trolley rails are provided at a front side of the drilling mast, extending into the moonpool and along a mast side moonpool wall part. A module handling trolley is provided which is—during module handling—movable along the vertical trolley rails in a vertical trolley path into the moonpool, and a hoisting device is adapted—during module handling—to lower and raise the module and/or the module handling trolley.

In common embodiments, a module handling device is provided which is adapted to—during module handling—transfer modules to the module handling trolley. The module handling device comprises skid rails on the main deck extending towards the moonpool wall. During module handling an unobstructed module handling area is provided above the skid rails and the moonpool.

In known embodiments wherein the drilling mast is a "multi-purpose tower" as known from the applicant, the drilling mast is adjustable for pipelay operations, by installing accessories such as tensioners to the multi-purpose tower.

In known embodiments, one or more tensioners are installed onto the drilling mast, each tensioner comprising a tensioner frame supported by the drilling mast and multiple tracks supported by said tensioner frame, said tracks being adapted to—in a pipeline laying configuration during laying flexible pipeline—engage the flexible pipeline and to support at least part of the weight of a launched pipeline in a firing line which extends on the outside of and adjacent to the front side of the drilling mast and through the moonpool.

Hence, although the known vessels provided with a multi-purpose tower are able to perform both module handling operations and laying flexible pipeline, this requires the installation and de-installation of tensioners. In view of the dimensions and weight of such tensioners, this is a time-consuming process.

SUMMARY OF THE INVENTION

It is an aim of the first aspect of the invention to provide an improved vessel and method to perform subsea wellbore related operations including module handling and laying flexible pipeline.

According to the first aspect of the present invention, at least the tensioner frame of a lower tensioner is mounted pivotably about a vertical pivot axis to the drilling mast, such that the tensioner frames are pivotable between the pipeline laying configuration wherein the lower tensioner is provided in the module handling area and an open configuration wherein the module handling area and at least part of the vertical trolley path is unobstructed to allow module handling.

This configuration allows a fast and easy switch between a module-handling configuration and a flexible pipeline laying configuration, resulting in a more versatile vessel and a more efficient method for performing subsea wellbore related operations including module handling and laying flexible pipeline.

The first aspect of the present invention thus relates to a vessel comprising
  a hull with a main deck;
  a moonpool having a moonpool wall extending through the hull,
  a stationary drilling mast having a closed contour mounted on the hull adjacent said moonpool, wherein the mast has a front side facing the moonpool.

In embodiments, such a hull is a mono-type hull, commonly provided with a bow and a stern and a main deck therebetween. Alternatively, it is also conceivable that the vessel is a semi-submersible.

In embodiments wherein the vessel is a mono-type hull, the moonpool is advantageously provided between the port and starboard side of the vessel, preferably centrally therebetween.

The stationary drilling mast is mounted adjacent said moonpool. Advantageously, the drilling mast is provided at a port side or a starboard side of the vessel. It is also conceivable that the drilling mast is provided at the front or rear side of the vessel, such that the moonpool and drilling mast are aligned parallel to the longitudinal axis of the vessel.

To perform module handling, a module handling trolley movable along trolley handling rails is provided. A hoisting device is adapted to lower and raise the module. Preferably, the hoisting device comprises a winch provided inside the drilling mast, and a cable extending from the winch via a top end of the drilling mast to the module handling trolley. Advantageously, the hoisting device is provided with a compensator to compensate for heave. Such a hoisting device is e.g. an A&R system, i.e. an 'abandonment and recovery' system comprising a winch, cable and one or more pulleys.

In embodiments, the hoisting device adapted to lower and raise the module is embodied as a crane, mounted on top of the drilling mast. In alternative embodiments, it is conceivable that the hoisting device adapted to lower and raise the module is a deck mounted crane, e.g. comprising a deep water lowering cable.

As is known in the art, according to the first aspect of the invention a module handling device is provided which is adapted to—during module handling—transfer modules to the module handling trolley. The module handling device comprises skid rails on the main deck extending towards the moonpool wall, wherein—during module handling—an unobstructed module handling area is provided above the skid rails and the moonpool. Possibly, hatches comprising aligned rails are provided over the moonpool during module handling.

In a preferred configuration wherein the drilling mast is provided at a port side or a starboard side of the vessel, the skid rails of the module handling device extend towards the moonpool wall transverse to the mast side moonpool wall part.

Advantageously, the stationary drilling mast comprises front, rear and two side plates interconnected by corner connections to form the closed contour. Such a configuration, e.g. obtained by welding, renders a relatively light-weight mast construction. Preferably, two vertical trolley rails are mounted to the two corner connections of the front plate with the side plates.

To perform flexible pipelaying, one or more tensioners are provided, preferably one or two above one another. Each tensioner comprises a tensioner frame supported by the drilling mast and multiple tracks supported by said tensioner frame, said tracks being adapted to—in a pipeline laying configuration during laying flexible pipeline—engage the flexible pipeline and to support at least part of the weight of a launched pipeline in a firing line which extends on the outside of and adjacent to the front side of the drilling mast and through the moonpool. Commonly, a tensioner is provided with 3-5 tensioner tracks, most commonly 4 tracks.

According to a first aspect of the present invention, at least the tensioner frame of a lower tensioner is mounted pivotably about a vertical pivot axis to the drilling mast, such that the tensioner frames are pivotable between the pipeline laying configuration wherein the lower tensioner is provided in the module handling area and an open configuration wherein the module handling area and at least part of the vertical trolley path is unobstructed to allow module handling.

In embodiments, only one tensioner is provided, of which the tensioner frame is mounted pivotably according to the first aspect of the present invention.

In alternative embodiments, two tensioners are provided above one another. It is conceivable that the dimensions of the module to be handled is such that only the lower tensioner is provided in the module handling area, and hence only the tensioner frame of the lower tensioner is mounted pivotably, while the tensioner frame of the upper tensioner is not pivotably mounted. As a result, not the entire vertical trolley path is unobstructed.

It is also conceivable that two tensioners are provided above one another, and that the tensioner frames of both tensioners are mounted pivotably about a vertical pivot axis to the drilling mast, such that in the open configuration thereof the entire vertical trolley path is unobstructed, in addition to the module handling area.

It is also conceivable that a tensioner is provided as a module, which can thus optionally be provided in the firing line.

Advantageously, the vessel further comprises one or more storage reels for storage of flexible pipeline to be laid. Such storage reels are optionally provided on another vessel adjacent to, or coupled to, the vessel of the first aspect of the present invention.

In embodiments, at least one horizontal hoist beam is mounted pivotably about a vertical pivot axis to the drilling mast, below the one or more tensioners, such that the hoist beam is displaceable between an operative configuration wherein the horizontal hoist beam extends perpendicular to the drilling mast, in the module handling area, and a non-operable configuration wherein the module handling area is unobstructed to allow module handling. Such horizontal hoist beams, commonly two, are generally provided to assist in equipment or accessory handling in the moonpool area, e.g. anodes or strakes.

Advantageously, the or both hoist beam(s) is/are mounted to a side of the drilling mast, perpendicular to the front side. As such, a pivoting movement away from the operative configuration removes the hoist beam away from the module handling area, and allows the hoist beam to be pivoted over 90-180°.

In embodiments, at least one centralizer is mounted pivotably about a horizontal pivot axis to the front side of the drilling mast, such that the centralizer is displaceable between an operative configuration wherein the centralizer extends perpendicular to the drilling mast, in the vertical trolley path, and a non-operable configuration wherein the centralizer has pivoted towards the drilling mast and the vertical trolley path is unobstructed to allow module handling. Such a centralizer, commonly provided above and one below each tensioner, assists in centralizing the pipeline during pipeline laying.

Advantageously, two vertical trolley rails are provided, and the at least one centralizer is provided between these vertical trolley rails.

In embodiments, an auxiliary crane is mounted at an elevated position to the drilling mast, preferably to a top end of the drilling mast. Possibly such an auxiliary crane is suitable for handling large accessories, such as end connectors, and provide such large accessories to the module handling trolley.

In embodiments, further a pipeline guide is provided, providing an arcuate guide surface in a vertical plane adapted to—during laying flexible pipeline—be mounted via a guide support structure above the one or more tensioners to guide said pipeline over the pipeline guide into the one or more tensioners and into the firing line.

In such an embodiment with a pipeline guide coiled tubing handling is possible, wherein use is made of a pipeline guide, preferably a chute, and a tensioner. During coiled tubing handling, it is conceivable that a four-track tensioner is operable in a two-track mode.

In embodiments, a coiled tubing injector is installed as a module into the firing line, above the one or more tensioners.

Commonly known pipeline guides include a chute, i.e. a semi-circular guide, and relatively larger aligner wheels.

In embodiments, the pipeline guide is mounted pivotable about a horizontal pivot axis to the drilling mast. This allows the pipeline guide to be pivoted away to clear part of the vertical trolley path.

In embodiments, the pipeline guide is mounted at an elevated position to the drilling mast.

In a preferred configuration wherein the drilling mast is provided at a port side or a starboard side of the vessel, the drilling mast is provided aside of the vertical plane of the arcuate guide surface. Possibly, in such embodiments, the guide support structure is embodied as a single-sided guide support arm arranged on one side of the pipeline guide only, one end of which is mounted to a side of the drilling mast, perpendicular to the front side the drilling mast, and onto the other end of which guide support arm a cantilevered carrier is provided to support the pipeline guide.

In an alternative configuration, in particular when a relatively small pipeline guide such as a chute is envisaged, it is conceivable that the pipeline guide is mounted to a tensioner frame. As such, the pipeline guide is pivotable together with the tensioner frame.

In a possible embodiment, the tensioner frame comprises a control installation which is pivotable together with the tensioner. This facilitates the pivot of the tensioner, as it does not require the disconnection/connection of hydraulics/electronics upon pivoting to the open and pipeline laying configuration respectively. In embodiments wherein the lower tensioner comprises two frame halves that are pivotable, advantageously each frame halve comprise its own hydraulic/electronic control installation.

In embodiments, the tensioner frame is mounted to a side of the drilling mast, perpendicular to the front side. This is in particular advantageous in configurations wherein the stationary drilling mast comprises front, rear and two side plates interconnected by corner connections to form the closed contour. Advantageously, two vertical trolley rails are mounted to the two corner connections of the front plate with the side plates.

Advantageously, the tensioner frame in the open configuration has pivoted essentially over 180° to adjoin a side of the mast, perpendicular to the front side. In embodiments wherein the lower tensioner comprises two frame halves that are pivotable, advantageously each frame halve is pivotable to adjoin a side of the mast. This is advantageous in view of the moment excerted by the tensioner frame to the mast. In addition, it is advantageous in view of the available space. In addition, it allows the provision of a maintenance platform at the side of the mast to which the tensioner or tensioner halve pivots, adjacent and below the tensioner frame in the open configuration.

As indicated before, in embodiments the lower tensioner comprises two frame halves with track units which are adapted to be conjoined to each other, each frame halve being pivotably mounted to the drilling mast about a respective vertical pivot axis, such that the frame halves are movable between the pipeline laying configuration in which the frame halves are conjoined in the module handling area to form an enclosed pipeline annulus able to support the pipeline, and the open configuration wherein the segments are disconnected and separated and have pivoted to clear the module handling area and at least part of the vertical trolley path. The one or more, preferably two, vertical trolley rails are advantageously provided between the vertical pivot axes of the frame halves of the tensioner.

Advantageously, the two frame halves each comprise two tensioner tracks.

A first aspect of the present invention also relates to a method for performing subsea wellbore related operations including module handling and laying flexible pipeline, e.g. wellbore intervention, wherein use is made of a vessel according to one or more of the claims 1-10.

An advantageous method comprises the following steps:
laying flexible pipeline with the one or more tensioners in the pipeline laying configuration;
pivoting the tensioner frames of a lower tensioner to the open configuration;
moving the module handling trolley to a module receiving position;
transferring a module via the module handling device to the module handling trolley at the module receiving position;
lowering the module into the moonpool.

An alternative advantageous method comprises the steps of:
mounting a pipeline guide via a guide support structure above the one or more tensioners to provide an arcuate guide surface in a vertical plane
run coiled tubing over the pipeline guide and through the one or more tensioners and into the firing line.

As such, the tensioners and pipeline guide of a pipelaying system are applied for running coiled tubing. Possibly, the tensioner is a four-track tensioner. Advantageously, such a four-track tensioner is also operable in a two-track mode during coiled tubing handling.

A second aspect of the present invention relates to a marine reel lay method pipeline installation system and a method for laying an offshore pipeline wherein use is made of a marine reel lay method pipeline installation system.

Marine reel lay method pipeline installation systems are commonly known in the art and commercially available from the applicant. Generally, such systems comprise:
a pipeline launch tower which is adapted to launch the pipeline in a firing line along said tower,
a pipeline guide provided at an elevated position, which is adapted to guide said pipeline over the pipeline guide into the firing line,
one or more tensioners, each tensioner comprising a tensioner frame supported by the tower and multiple tracks supported by said tensioner frame, said tracks being adapted to—in a flexible pipeline laying configuration—engage the flexible pipeline and to support at least part of the weight of a launched pipeline in the firing line;
one or more vertical trolley rails supported by the pipeline launch tower;
a trolley which is movable along the vertical trolley rails in a vertical trolley path;
a hoisting device being adapted to lower and raise the trolley.

The trolley may e.g. be provided to perform J-lay operations, accessory handling, guide an A&R cable, end connector handling, etc. etc.

For example in WO2007/108673 a configuration comprising retractable tensioners is disclosed, wherein the trolley is embodied as a travelling clamp used to perform J-lay operations.

WO2009/134116 of the same applicant a system is described with an auxiliary trolley which is provided with sheaves of the A&R sheave arrangement.

In WO2014/120004 of the same applicant a system is disclosed wherein the trolley is in particular embodied to assist in lowering end connectors.

It is an aim of the second aspect of the invention to provide an improved marine reel lay method pipeline installation system and a method for laying an offshore pipeline wherein use is made of a marine reel lay method pipeline installation system.

According to the second aspect of the invention, the lower tensioner comprises two frame segments with track units which are adapted to be conjoined to each other, each one being pivotably mounted to the tower about a respective vertical pivot axis, and in that the one or more vertical trolley rails are positioned between these vertical pivot axes; the frame segments being movable between a closed flexible pipeline laying configuration in which the frame segments are conjoined to form an enclosed pipeline annulus able to support the pipeline, and an open configuration wherein the segments are disconnected and separated and have pivoted over at least 90° to clear the vertical trolley path.

This configuration allows a fast and easy switch between a pipeline laying configuration and a trolley-operation, resulting in a more versatile system and a more efficient method.

In embodiments, the marine pipeline installation system is provided on a vessel, preferably a mono-hull vessel. Advantageously, the vessel is provided with one or more storage reels for flexible pipelines. Alternatively, a separate vessel is provided for the storage of the storage reels.

In embodiments, the pipeline launch tower is embodied as an A-frame. Advantageously, two vertical trolley rails are provided at the 'legs' of the A-frame.

Alternatively, it is well conceivable that the pipeline launch tower is embodied as a mast having a closed outer contour, advantageously being made of plate-shaped elements.

Advantageously the pipeline launch tower has a square or rectangular cross section, defining a front side adjoining the vertical trolley path and perpendicular sides thereto.

In embodiments, two vertical trolley rails are provided, advantageously at the corners of the pipeline launch tower between the front side and the perpendicular sides.

A pipeline guide is provided, providing an arcuate guide surface in a vertical plane adapted to—during laying flexible pipeline—be mounted via a guide support structure above the one or more tensioners to guide said pipeline over the pipeline guide into the one or more tensioners and into the firing line.

In embodiments, the pipeline guide is mounted to the pipeline launch tower.

Commonly known pipeline guides include a chute, i.e. a semi-circular guide, and relatively larger aligner wheels.

In embodiments, the pipeline guide is mounted pivotable about a horizontal pivot axis to the drilling mast. This allows the pipeline guide to be pivoted away to clear part of the vertical trolley path.

In an alternative configuration, in particular when a relatively small pipeline guide such as a chute is envisaged, it is conceivable that the pipeline guide is mounted to a tensioner frame. As such, the pipeline guide is pivotable together with the tensioner frame.

According to the second aspect of the invention, the lower tensioner, and possibly also other tensioners, comprise two frame segments with track units. In an embodiment, the frame segments are frame halves, each comprising the same number of tracks, e.g. two tracks.

In embodiments, only one tensioner is provided, of which the tensioner frame is mounted pivotably according to the first aspect of the present invention.

In alternative embodiments, two tensioners are provided above one another. It is conceivable that the dimensions of the module to be handled is such that only the lower tensioner is provided in the module handling area, and hence only the tensioner frame of the lower tensioner is mounted pivotably, while the tensioner frame of the upper tensioner is not pivotably mounted. As a result, not the entire vertical trolley path is unobstructed.

It is also conceivable that two tensioners are provided above one another, and that the tensioner frames of both tensioners are mounted pivotably about a vertical pivot axis to the drilling mast, such that in the open configuration thereof the entire vertical trolley path is unobstructed, in addition to the module handling area.

In embodiments wherein the pipeline launch tower has a square or rectangular cross section, defining a front side adjoining the vertical trolley path and perpendicular sides thereto, advantageously the frame segments are mounted to the sides of the pipeline launch tower. The one or more vertical trolley rails are preferably provided at the front side of the pipeline launch tower. In possible embodiments, the frame segments in the open configuration have pivoted essentially over 180°, adjoining sides of the tower. This is advantageous in view of the moment excerted by the tensioner frame to the mast. In addition, it is advantageous in view of the available space. In addition, it allows the provision of a maintenance platform at the side of the mast to which the tensioner or tensioner halve pivots, adjacent and below the tensioner frame in the open configuration.

In possible embodiments, a frame segment comprises a hydraulic or electric control installation which is pivotable together with the frame halve. This facilitates the pivot of the tensioner, as it does not require the disconnection/connection of hydraulics/electronics upon pivoting to the open and pipeline laying configuration respectively. In embodiments wherein the lower tensioner comprises two frame halves that are pivotable, advantageously each frame halve comprise its own hydraulic/electric control installation.

The second aspect of the present invention also relates to a method for laying an offshore pipeline wherein use is made of a marine reel lay method pipeline installation system according to one or more of the claims 13-17.

An advantageous method comprises the following steps:
- laying a flexible pipeline with the one or more tensioners in the pipeline laying configuration;
- pivoting the tensioner frame segments to the open configuration;
- operating the hoisting device to lower and raise the trolley in the unobstructed vertical trolley path.

BRIEF DESCRIPTION OF THE DRAWINGS

Both aspects of the invention will be further elucidated in the drawings, in which.

DETAILED DESCRIPTION OF THE INVENTION

Figure 1A:
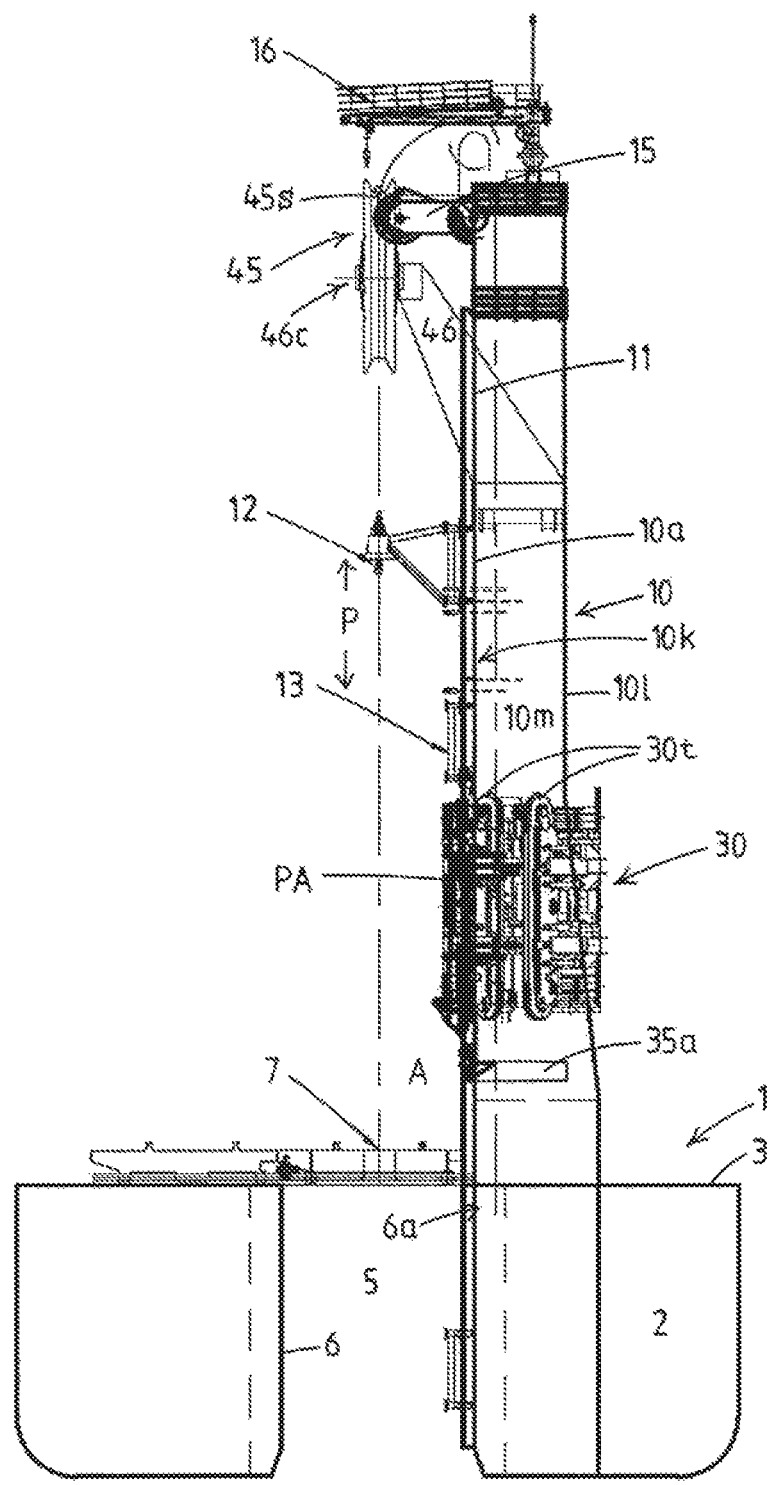
FIG. 1a shows a first embodiment of part of a vessel according to both aspects of the invention in cross-section, perpendicular to the longitudinal axis of the vessel, with the tensioner in the open configuration.

In FIGS. 1a, 1b, 2a, 2b and 3a vessel 1 is shown, which is adapted to perform subsea wellbore related operations including module handling and laying flexible pipeline, e.g. wellbore intervention. The shown vessel 1 comprises a hull 2 with a main deck 3, and a moonpool 5 having a moonpool wall 6 extending through the hull 2. Here, the moonpool is optionally covered by a skiddable hatch 7, which in the top view of FIG. 3 is shown over the moonpool in continuous lines, and aside of the moonpool in intermittent lines.

Figure 4:
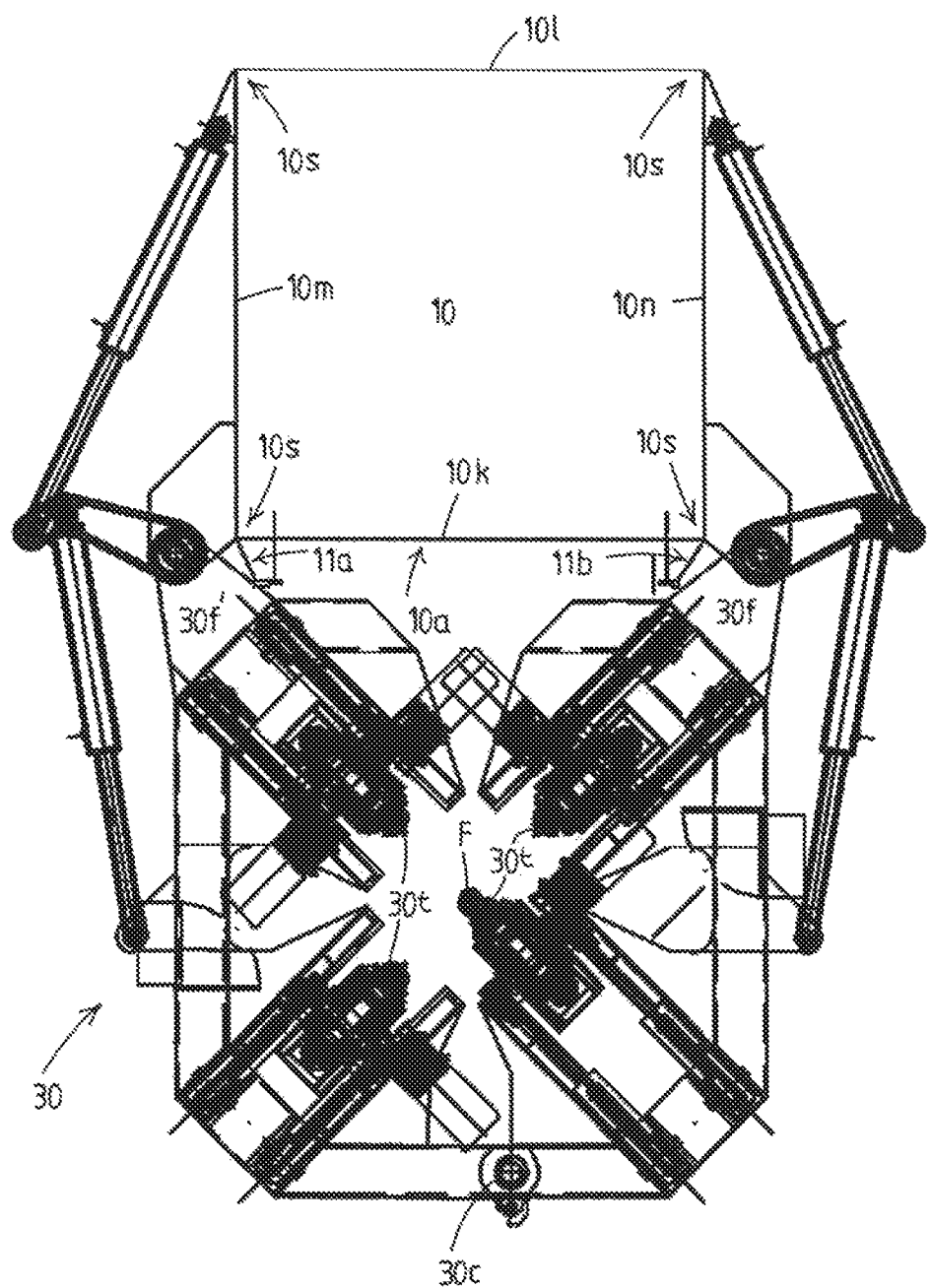
FIG. 4 shows a cross-section of an embodiment of a tensioner according to both aspects of the invention in pipeline laying configuration.
Figure 5A:
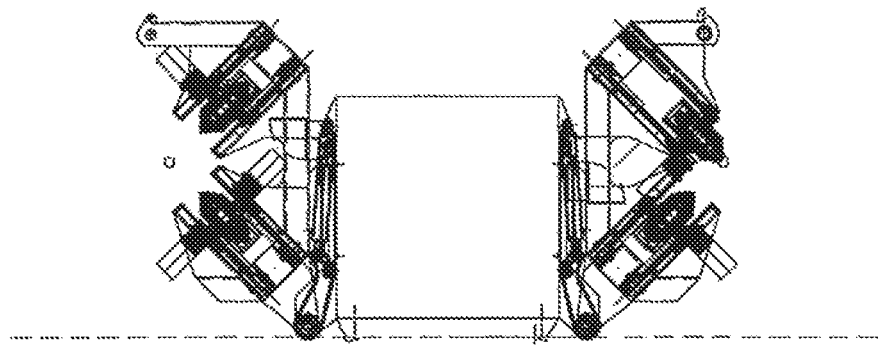
FIG. 5a shows a cross-section of the tensioner of FIG. 4 in an open configuration.
Figure 5B:
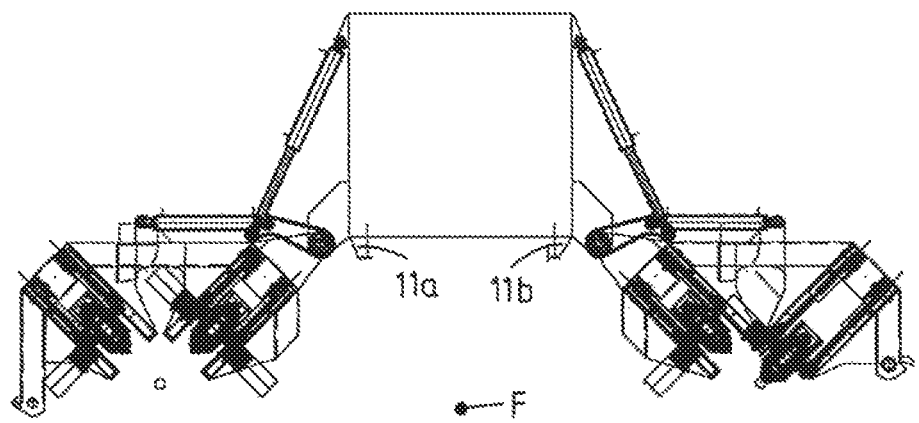
FIG. 5b shows a cross-section of the tensioner of FIG. 4 in an intermediate configuration.
Figure 6:
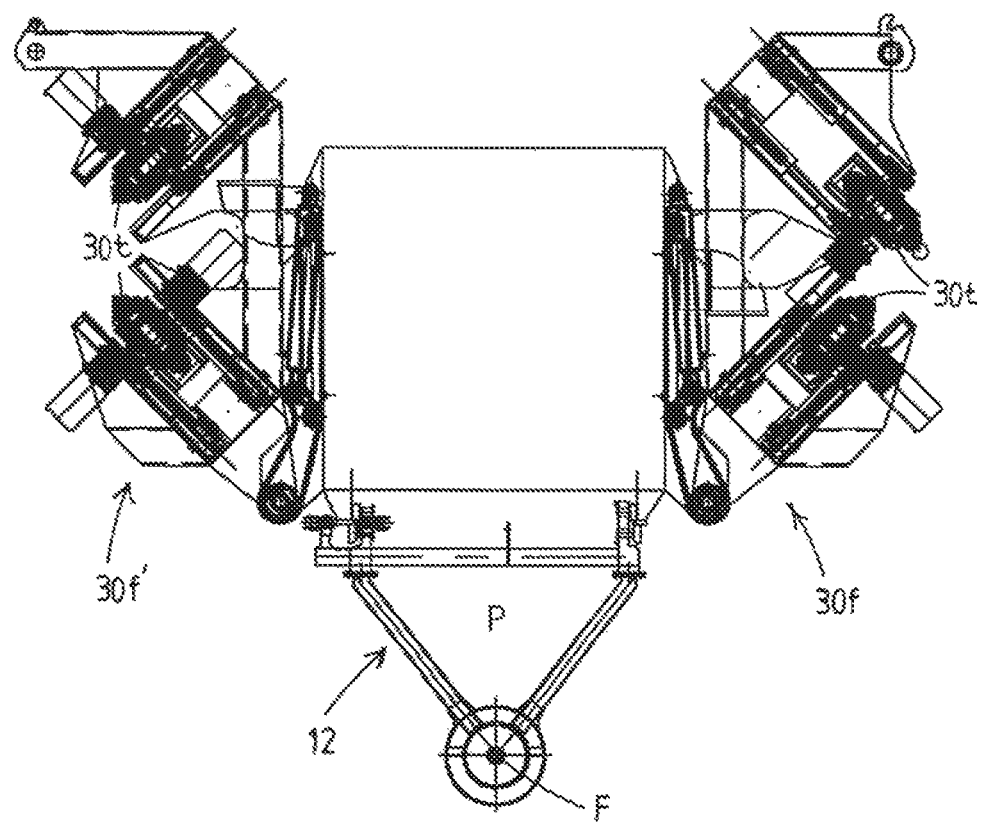
FIG. 6 shows a cross-section of the tensioner of FIG. 4 in an open configuration with a module handling trolley in the vertical trolley path.

In FIGS. 4, 5a, 5b and 6a tensioner 30 and drilling mast/pipeline launch tower 10 according to both aspects of the invention are shown in detail and in cross-section. In FIG. 4 the tensioner is shown in a pipeline laying configuration; in FIG. 5a in an open configuration; in FIG. 5b in an intermediate configuration; and in FIG. 6 in an open configuration with a module handling trolley in the vertical trolley path. Same parts are given same reference numerals.

The shown vessel 1 is provided with a stationary drilling mast 10 having a closed contour mounted on the hull 2 adjacent said moonpool 5, wherein the mast 10 has a front side 10a facing the moonpool 5. The moonpool wall 6 comprises a mast side moonpool wall part 6a at the side of the mast 10.

According to the present invention, the vessel 1 comprises one or more vertical trolley rails 11 provided at the front side 10a of the drilling mast 10, extending into the moonpool 5 and along a mast side moonpool wall part 6a. A module handling trolley 12, and in the shown embodiments also a cursor trolley 13 are provided, which are—during module handling—movable along the vertical trolley rails 11, here two rails 11a, 11b, in a vertical trolley path P into the moonpool 5.

A hoisting device 15 is provided which is adapted—during module handling—to lower and raise the module handling trolley 12, and/or a module. Optionally, in the shown embodiment, an auxiliary crane, here a service crane 16 is mounted at an elevated position to the drilling mast, preferably to a top end of the drilling mast. It is also conceivable that this service crane is adapted to lower and raise the module handling trolley 12 and/or a module in addition to or instead of the hoisting device 15. The hoisting device 15 is advantageously mounted movable, such that it can be cleared from the firing line.

Figure 3:
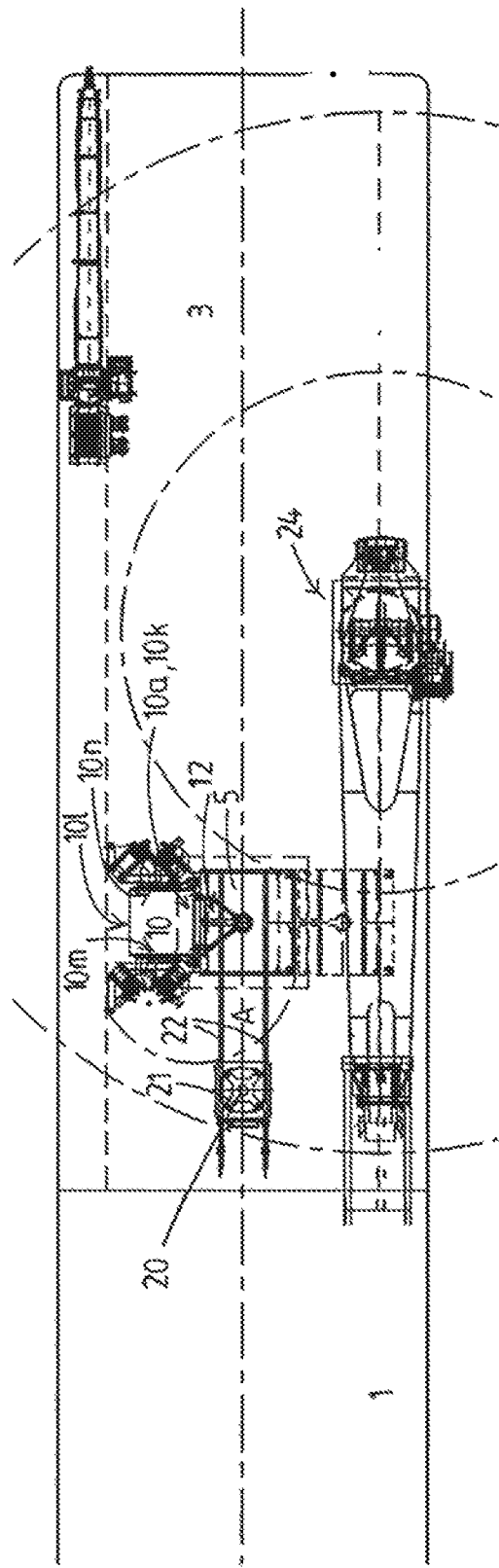
FIG. 3 shows the first embodiment of part of the vessel in top view.

Furthermore, a module handling device 20 is provided, visible in FIG. 3, adapted to—during module handling—transfer a module 21 to the module handling trolley 12, comprising skid rails 22 on the main deck 3 extending towards the moonpool wall 6, wherein—during module handling—an unobstructed module handling area A is provided above the skid rails 22 and the moonpool. In the shown embodiment, the skid rails 22 are aligned with skid rails provided on the skiddable hatch 7 to bring the module in the vertical trolley path P.

It is also conceivable that a crane, e.g. deck mounted crane such as crane 24 shown in FIG. 3 is used to bring the module from the skid rails into the vertical trolley path, and to lower an raise the module handling trolley 12 and/or a module. For example, the crane has a capacity to transfer end connectors into the vertical trolley path. In embodiments, the crane is provided with a deep water lowering cable. Hence, it is well conceivable that the hoisting capacity of the crane exceeds the capacity of the tensioners.

According to the present invention, the vessel comprises one or more tensioners. In the embodiment of FIGS. 1a and 1 b, one tensioner 30 is provided. In the embodiment of FIGS. 2a and 2b, an additional tensioner 31 is provided above tensioner 30. For example, the tensioner 30 has a capacity of 200 mt. The overall pipelaying capacity can thus be increased by providing an additional tensioner 31, e.g. also a 200 mt capacity tensioner.

Each tensioner 30, 31 comprises a tensioner frame 30f; 31f supported by the drilling mast and multiple tracks 30t; 31t supported by said tensioner frame. This is shown in further detail in FIGS. 4-6. Said tensioner tracks are adapted to—in a pipeline laying configuration during laying flexible pipeline—as shown in FIGS. 2a and 2b and in FIG. 4—engage the flexible pipeline (not shown) and to support at least part of the weight of a launched pipeline in a firing line F which extends on the outside of and adjacent to the front side of the drilling mast 10a and through the moonpool 5.

According to the invention, at least the tensioner frame of the lower tensioner 30 is mounted pivotably about a vertical pivot axis PA to the drilling mast. Here, the tensioner frame comprises two frame parts or frame halves 30f and 30f' that are each mounted pivotably about a respective vertical pivot axis PA and PA' to the drilling mast, such that the tensioner frame parts/halves are pivotable between the pipeline laying configuration in which the frame halves are conjoined in the module handling area to form an enclosed pipeline annulus able to support the pipeline (FIGS. 2a, 2b and FIG. 4) and an open configuration (FIGS. 1a, 1 b and FIGS. 5a and 6) wherein the segments are disconnected and separated and have pivoted to clear the module handling area and at least part of the vertical trolley path, such that the module handling area and at least part of the vertical trolley path P is unobstructed to allow module handling. The frame halves 30f, 30f' each comprise two tracks 30t, which are adapted to be conjoined to each other, here at the connection 30 c visible in FIG. 4.

In FIG. 2b, it is visible that in the shown embodiment each tensioner frame, in particular each tensioner frame part, comprises an electric control installation 30h; 30h'; 31h; 31h' which is pivotable together with the tensioner frame parts.

Figure 1B:
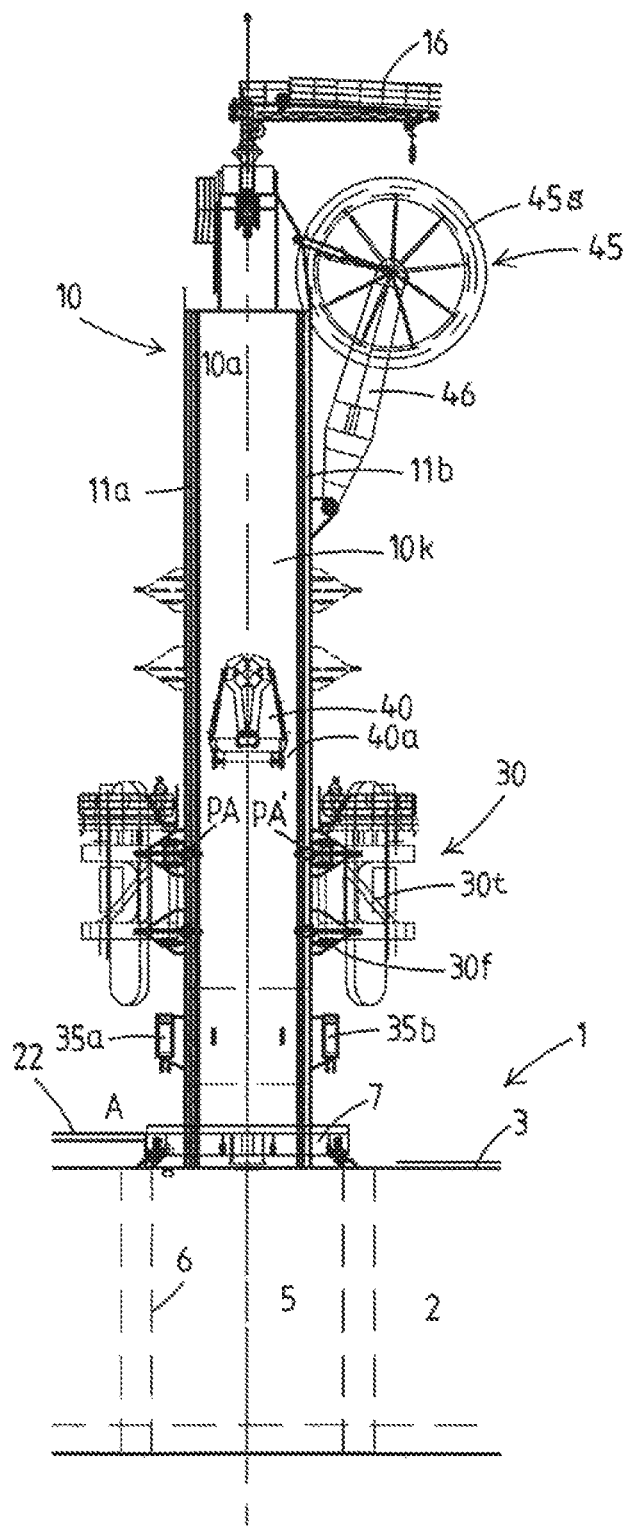
FIG. 1b shows the embodiment of FIG. 1a in cross section, along the longitudinal axis of the vessel.
Figure 2A:
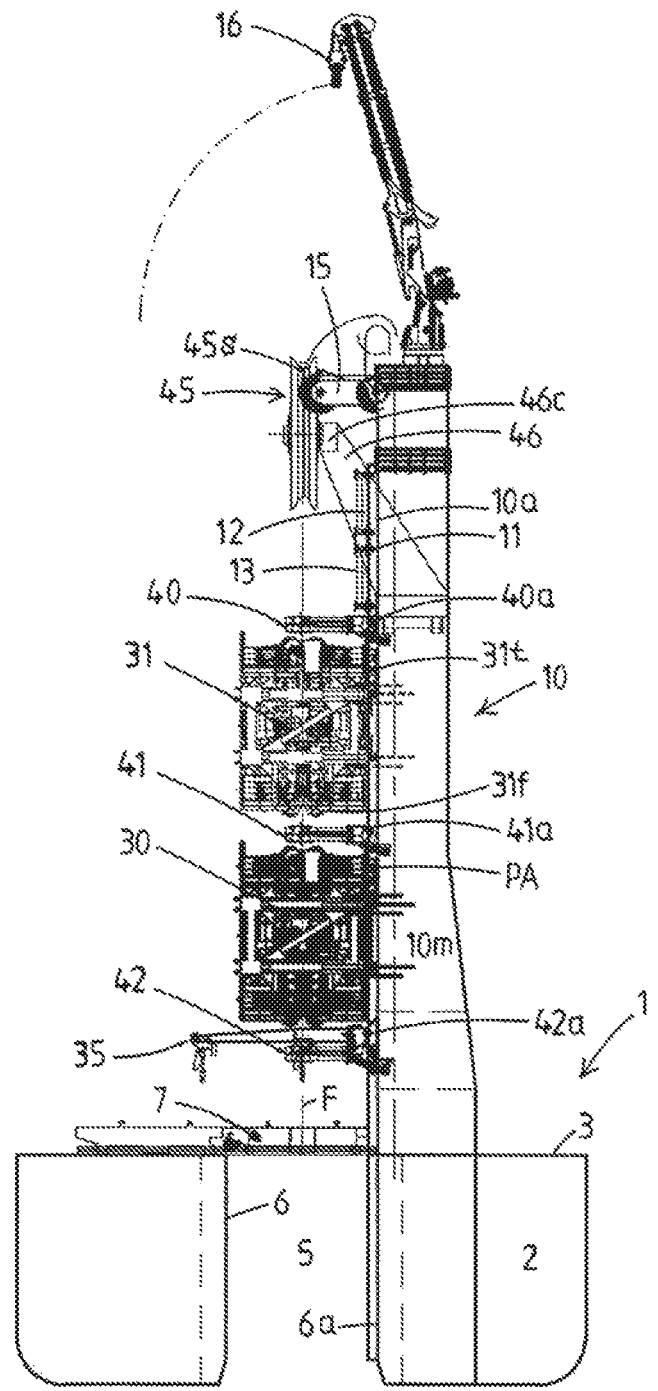
FIG. 2a shows a second embodiment of part of a vessel according to both aspects of the invention in cross-section, perpendicular to the longitudinal axis of the vessel, with the tensioners in the pipeline laying configuration.
Figure 2B:
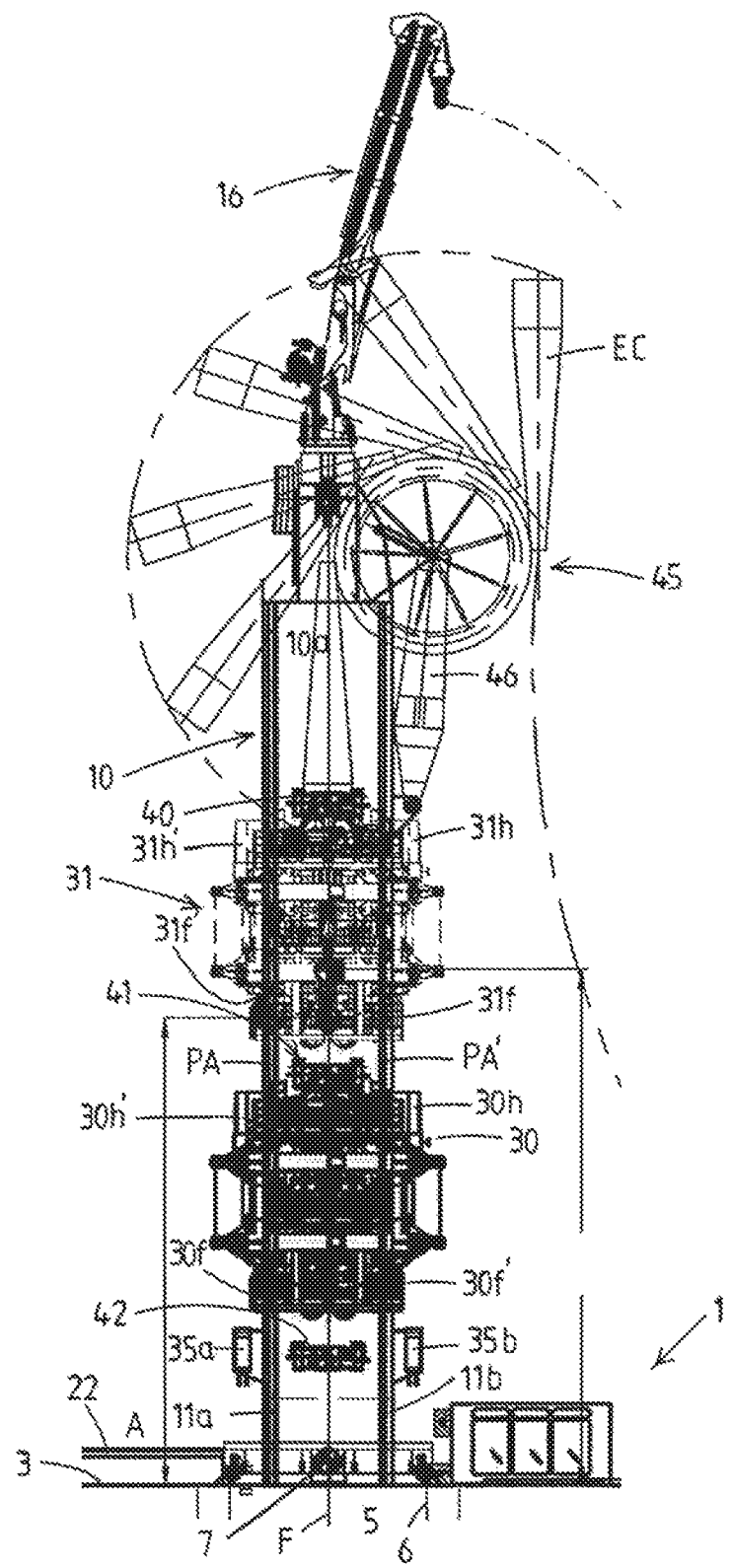
FIG. 2b shows the embodiment of FIG. 2a in cross section, along the longitudinal axis of the vessel.

In the embodiments of FIGS. 1a, 1b, 2a and 2b, a pair of optional horizontal hoist beams 35a, 35b is visible, which are shown in cross-section in FIGS. 1b and 2b. The hoist beams 35a, 35b are advantageously mounted pivotably about a vertical pivot axis PA, PA' to the drilling mast, here coinciding with the pivot axes of the tensioner frame parts, below the one or more tensioners 30; 31. As such the hoist beams 35a, 35b are displaceable between an operative configuration, shown in FIG. 2a wherein the horizontal hoist beam extends perpendicular to the drilling mast, in the module handling area, and a non-operable configuration, shown in FIG. 1a, wherein the module handling area is unobstructed to allow module handling. Here, the hoist beam 35a has pivoted to a position adjacent a side of the drilling mast 10.

In the embodiments of FIGS. 1a, 1b, 2a and 2b, also optional centralizers 40, 41, 42 are visible, provided above and below the one or more tensioners 30, 31. Each centralizer is mounted pivotably about a horizontal pivot axis 40a, 41a, 42a to the front side 10a of the drilling mast 10, such that the centralizer is displaceable between an operative configuration wherein the centralizer extends perpendicular to the drilling mast, in the vertical trolley path, as shown in FIGS. 2a and 2b, and a non-operable configuration wherein the centralizer has pivoted towards the drilling mast and the vertical trolley path is unobstructed to allow module handling, as visible in FIG. 1b.

Such a centralizer is possibly embodied as a rollerbox. It may be operable to centralize a pipe. It is also conceivable that it is embodied as a cable guide, e.g. for a deep water lowering cable.

The stationary drilling mast 10 as shown in the drawings comprises a front plate 10k at the front side 10 thereof, and a rear plate 10l and two side plates 10m; 10n which are interconnected by corner connections 10s to form the closed contour. This is shown in an enlarged view in FIG. 4. Two vertical trolley rails 11a; 11b are mounted to the two corner connections 10a of the front plate 10k with the side plates 10m; 10n.

In the shown configuration, again best visible in FIG. 4, the two tensioner frame parts 30f, 30f' of the tensioner frame 30f are mounted pivotably to a side 10m; 10n of the drilling mast/tower, perpendicular to the front side 10k. In the open configuration, the tensioner frame has pivoted essentially over 180° to adjoin a side of the mast, perpendicular to the front side.

According to the second aspect of the invention, in the shown configuration, the two tensioner frame parts 30f, 30f' of the tensioner frame 30f are mounted pivotably to the drilling mast/tower, about a respective pivot axis PA, PA'. The vertical trolley rails 11a, 11 b are positioned between these vertical pivot axes PA, PA'. The frame segments 30f, 30f' are movable between a closed flexible pipeline laying configuration in which the frame segments are conjoined to form an enclosed pipeline annulus able to support the pipeline (FIGS. 2a, 2b, 4), and an open configuration (FIGS. 1a, 1b, 5a, 6) wherein the segments are disconnected and separated and have pivoted over at least 90° (FIG. 5b) to clear the vertical trolley path.

In the embodiments of FIGS. 1a, 1b, 2a and 2b, also an optional pipeline guide 45 is provided, here embodied as an aligner wheel. The pipeline guide 45 provides an arcuate guide surface 45s in a vertical plane, and is adapted to—during laying flexible pipeline—be mounted via a guide support structure 46 above the one or more tensioners 30; 31 to guide said pipeline over the pipeline guide into the one or more tensioners and into the firing line F. As visible in FIG. 2b, the pipeline guide 45, together with auxiliary crane 16, may allow the passage of an end connector EC of a pipeline (not shown) into the firing line. In an alternative embodiment, the pipeline guide 45 is mounted movable and adapted to be cleared from the firing line. An end connector is e.g. positionable in the firing line by a deck mounted crane.

As visible in FIG. 3, the drilling mast 10 is provided at a port side or a starboard side of the vessel. From FIGS. 1a, 1 b, 2a and 2b follows that the drilling mast 10 is provided aside of the vertical plane of the arcuate guide surface 45s. In the shown embodiment, the guide support structure 46 is embodied as a single-sided guide support arm arranged on one side of the pipeline guide 45 only, one end of which is mounted to a side 10m of the drilling mast, perpendicular to the front side 10k of the drilling mast, and onto the other end of which guide support arm a cantilevered carrier 46c is provided to support the pipeline guide 45.

The invention claimed is:

1. A marine reel lay method pipeline installation system for laying a flexible pipeline on the seabed, wherein the system comprises:
   a pipeline launch tower which is adapted to launch the flexible pipeline in a firing line along said tower;
   a pipeline guide provided at an elevated position, which is adapted to guide said pipeline over said pipeline guide into said firing line;
   one or more tensioners, each of the one or more tensioners comprising:
      a tensioner frame supported by said pipeline launch tower; and
      multiple track units supported by said tensioner frame, said track units being adapted to engage the flexible pipeline and to support at least part of the weight of a launched flexible pipeline in the firing line, in a flexible pipeline laying configuration thereof,
   wherein the tensioner frame of the single tensioner, or at least the tensioner frame of a lower tensioner of the multiple tensioners, comprises two frame segments with one or more of the multiple track units, the two frame segments being adapted to be conjoined to each other, each of said two frame segments being pivotably mounted to said pipeline launch tower about a respective vertical tensioner pivot axis, allowing said two frame segments to be pivotable between:
      a closed flexible pipeline laying configuration in which the frame segments are conjoined to form an enclosed pipeline annulus and are able to support the pipeline; and
      an open configuration wherein the segments are disconnected and separated and have pivoted over at least 90°;
   one or more vertical trolley rails supported by said pipeline launch tower and positioned between said vertical tensioner pivot axes of said two frame segments;
   a trolley which is movable along said one or more vertical trolley rails in a vertical trolley path which is unobstructed when said two frame segments are in the open configuration wherein the segments are disconnected and separated and have pivoted over at least 90°; and
   a hoisting device being adapted to lower and raise said trolley.

2. The marine reel lay method pipeline installation system according to claim 1, wherein the pipeline launch tower is square or rectangular in cross-section having a front side adjoining the vertical trolley path and perpendicular sides thereto.

3. The marine reel lay method pipeline installation system according to claim 2, wherein the frame segments are mounted to the perpendicular sides of the pipeline launch tower.

4. The marine reel lay method pipeline installation system according to claim 3, wherein the frame segments in the open configuration have pivoted over 180°, adjoining the perpendicular sides of the tower.

5. The marine reel lay method pipeline installation system according to claim 1, wherein at least one of the frame segments comprises a control installation which is pivotable together with said at least one of the frame segments.

6. The marine reel lay method pipeline installation system according to claim 1, wherein the one or more vertical trolley rails extend beyond the pipeline launch tower along a hull part of a vessel, and into a moonpool.

7. The marine reel lay method pipeline installation system according to claim 1, wherein two vertical trolley rails are provided.

8. A method for laying an offshore pipeline, comprising the steps of:
   laying the flexible pipeline using the marine reel lay method pipeline installation system according to claim 1 with the one or more tensioners in the pipeline laying configuration;
   pivoting said tensioner frame segments to the open configuration; and
   operating the hoisting device to lower and raise the trolley in the unobstructed vertical trolley path.

* * * * *